United States Patent [19]

Reade

[11] 4,059,454
[45] Nov. 22, 1977

[54] GREEN COLORED GLASSES

[75] Inventor: Richard F. Reade, Corning, N.Y.

[73] Assignee: Corning Glass Works, Corning, N.Y.

[21] Appl. No.: 696,582

[22] Filed: June 16, 1976

[51] Int. Cl.$^2$ ............ C03B 32/00; C03C 15/00; C03C 3/22

[52] U.S. Cl. ............ 106/39.7; 65/30 E; 65/33; 106/39.8

[58] Field of Search ........... 65/33, 30 E; 106/39.7, 106/39.8

[56] References Cited

U.S. PATENT DOCUMENTS

| | | | |
|---|---|---|---|
| 3,428,513 | 2/1969 | Denman | 65/33 X |
| 3,788,865 | 1/1974 | Babcock et al. | 65/33 X |
| 3,902,881 | 9/1975 | Pikooz | 65/30 E |
| 3,938,977 | 2/1976 | Gliemeroth | 65/33 X |
| 3,940,531 | 2/1976 | Demarest, Jr. | 65/33 X |
| 3,950,596 | 4/1976 | Carr et al. | 65/33 X |
| 4,007,048 | 2/1977 | Sack et al. | 65/33 X |

*Primary Examiner*—S. Leon Bashore
*Assistant Examiner*—Frank W. Miga
*Attorney, Agent, or Firm*—Clinton S. Janes, Jr.; Clarence R. Patty, Jr.

[57] ABSTRACT

The present invention is related to the production of glasses in the $Li_2O$—$Al_2O_3$—$SiO_2$ or $Na_2O$—$Al_2O_3$—$SiO_2$ composition systems containing NiO and $TiO_2$. Such glasses exhibit a brown coloration when first melted but the color is converted to a green hue after exposure to a particularly-defined heat treatment. The green coloration results from the growth of a small amount of very fine-grained crystallites of nickel spinel ($NiO.Al_2O_3$). The crystallized articles can be chemically strengthened utilizing a low temperature ion exchange reaction.

11 Claims, No Drawings

GREEN COLORED GLASSES

BACKGROUND OF THE INVENTION

The instant invention is founded in the discovery that nickel oxide (NiO) has a unique ability to retard or totally suppress $TiO_2$-induced nucleation of the low temperature crystal phases in alkali metal aluminosilicate glasses, viz., beta-quartz solid solution (beta-eucryptite) in lithium aluminosilicate glasses and carnegieite ($Na_2O.Al_2O_3.2SiO_2$) in low silica, sodium or sodium-potassium aluminosilicate glasses. Hence, the heat treatment of such glass compositions, also containing $TiO_2$, commonly results in the conversion of the glass to a glass-ceramic article. However, the inclusion of NiO inhibits the normal growth of silicate crystals during heat treating of the glass and, instead, causes a color change from brown to green to be effected. Colors ranging from light yellow-green to dark emerald to blue-green can be obtained, depending upon glass composition and heat treatment. The glassy products are transparent and, particularly in the case of $Li_2O$-containing compositions, can be chemically strengthened to very high values, utilizing low temperature exposures to baths of molten salts.

The heat-induced color shift from brown to green indicates a change in coordination of the $Ni^{+2}$ ion from tetrahedral to octahedral. Whereas the inclusion of both NiO and $TiO_2$ in the glass composition is essential for the development of the green coloration, the NiO inhibits $TiO_2$ from performing its customary function as a nucleating agent for beta-quartz solid solution (s.s.) or carnegieite. It must be recognized, however, that the glassy, low crystalline, green state is metastable with respect to temperature. Sufficiently elevated temperatures will transform the $Li_2O$-containing, green glassy material to transparent, reddish-brown beta-quartz s.s. glass-ceramic articles and, at still higher temperatures, opaque beta-spodumene s.s. glass-ceramics will be produced. In like manner, the transparent $Na_2O$-containing glassy materials will first be converted to carnegieite glass-ceramic articles and, at still higher tempratures, nepheline glass-ceramics will be produced.

The ability of NiO to inhibit nucleation of $TiO_2$ in this manner appears to be unique. Thus, the phenomenon was not observed with other transition metal oxides such as MnO, FeO, CoO, or CuO. Glasses having compositions in the alkali metal aluminosilicate field containing any one or more of those oxides with $TiO_2$ were converted in the normal manner to beta-quartz s.s. or carnegieite glass-ceramics. Furthermore, no unusually colored intermediate glassy state was observed.

Although the reaction mechanism through which NiO suppresses nucleation is not completely understood, both the suppression of nucleation and the development of green color are associated with the growth of a small amount, i.e., less than about 5% by volume, of very fine-grained crystallites of nickel spinel ($NiO.Al_2O_3$) during the prescribed heat treatment of the glass. This compound is well-developed in nickel-containing beta-spodumene s.s. and nepheline glass-ceramic bodies and imparts a bluish-green coloration thereto. X-ray diffraction analyses of the inventive green glasses have identified two very weak, diffuse, diffraction peaks, the intensities of which vary with the NiO content of the composition. These peaks, centered at d-spacings of about 2.43A and 2.01A, correlate to the two strongest lines of $NiO.Al_2O_3$. It is known in the crystallographic literature that $NiO.Al_2O_3$ is an "inverse" spinel wherein the $Ni^{+2}$ ions occupy octahedrally coordinated positions, consistent with the green color.

The essentially complete freedom from haze exhibited by the green glass of the invention and the diffuse nature of the diffraction peaks are evidence that the size of the spinel crystallites is less than the wavelength of visible light, i.e., less than a few thousand angstroms in diameter.

It is postulated that the formation of the nickel spinel must in some way upset the nucleation process. Three possible mechanisms underlying the action of NiO have been hypothesized. First, the presence of NiO may prevent the development of $Al_2Ti_2O_7$, believed to be the source of nuclei in the alkali metal aluminosilicate glass system. Second, a solid solution of NiO, $Al_2O_3$, and $TiO_2$ having the structure of spinel may be formed. Third, $TiO_2$ may nucleate the nickel spinel preferentially to beta-quartz s.s or carnegieite. Any of those events might well result in the suppression of the conventional $TiO_2$ nucleation of silicate crystal phases.

SUMMARY OF THE INVENTION

Glasses exhibiting a green coloration and containing a minor amount of nickel spinel crystallization can be prepared from compositions in the $Li_2O$—$Al_2O_3$—$SiO_2$—$NiO$—$TiO_2$ quinary consisting essentially, by weight on the oxide basis, of about 3–7.5% $Li_2O$, 18–28% $Al_2O_3$, 58–72% $SiO_2$, 0.3–4.5% NiO, and 2.5–8% $TiO_2$, and from compositions in the $Na_2O$—$Al_2O_3$—$SiO_2$—$NiO$—$TiO_2$ quinary approximating the stoichiometry of carnegieite ($Na_2O.Al_2O_3.2SiO_2$) consisting essentially, by weight on the oxide basis, of about 10–20% $Na_2O$, 30–36% $Al_2O_3$, 35–40% $SiO_2$, 1–3% NiO, and 4–8% $TiO_2$. Up to about 10% $K_2O$ may be included in the latter compositions which may enter into and form a carnegieite solid solution.

The method of the invention contemplates three general steps:

First, a glass composition of the proper proportions is melted;

Second, the melt is simultaneously cooled to a temperature at least below the transformation range of the glass and an article of a desired configuration shaped therefrom; and thereafter Third, the glass article is exposed to a temperature of at least about 675° C., but not more than about 900° C., for a period of time adequate to cause the growth in situ of nickel spinel crystals therein.

Where a strengthened glass article is desired, the crystallized body will be contacted with an external source of $Na^+$ and/or $K^+$ ions at an elevated temperature, normally at least 300° C., but below the strain point of the glass. Conventionally, the external source of ions will be a bath of a molten sodium and/or potassium salt.

It has been observed that the molar ratio of $Al_2O_3$ to the sum of all modifier ions in the glass composition, including NiO, will customarily be at least 0.95 to insure the development of the desired green coloration.

DESCRIPTION OF PREFERRED EMBODIMENTS

Table I records glass compositions, expressed in parts by weight on the oxide basis, which illustrate the compositional parameters of the present invention. Because the sum of the individual components of the several examples totals or closely approximates 100, the compositions can reasonably be considered to be expressed in terms of weight percent.

The batch ingredients, themselves, can comprise any materials, either the oxides or other compounds, which, upon being melted together, will be transformed into the desired oxide in the proper proportions. The ingredients of the batch were compounded, ballmilled together to aid in achieving a homogeneous melt, and then deposited into platinum crucibles. The crucibles were covered, placed into a furnace operating at 1650° C., and held therein for about 16 hours. Cane about ¼ inch in diameter was hand drawn from the melt and the remainder was poured into a steel mold having the dimensions of 6 inch × 6 inch × ½ inch. The cane was allowed to cool to room temperature in the ambient air, but the slab was immediately transferred to an annealer operating at 450°-500° C., depending upon the composition of the glass. $As_2O_3$ was included to perform its conventional function of a fining agent.

In the laboratory work described herein, the glass slabs and cane were cooled to room temperature to permit examination of the articles for glass quality, and the slabs were annealed to allow the sawing thereof into pieces suitable for conducting various physical property measurements thereon. However, such cooling to room temperature is not mandatory for the operability of the instant invention, but the glass bodies must be cooled to a temperature at least below the transformation range before being exposed to the heat treatment required to produce the in situ crystallization of $NiO.Al_2O_3$. (The transformation range has been defined as that temperature at which a glass melt is deemed to have been converted into an amorphous solid, that temperature commonly being considered to lie in the vicinity of the glass annealing point.)

All of the glass bodies demonstrated a transparent appearance as formed with a brownish coloration, the intensity of the coloration varying with the NiO content.

TABLE I

|  | 1 | 2 | 3 | 4 | 5 | 6 | 7 |
|---|---|---|---|---|---|---|---|
| $SiO_2$ | 68.9 | 68.8 | 68.1 | 68.0 | 67.7 | 61.9 | 60.5 |
| $Al_2O_3$ | 20.5 | 20.5 | 20.3 | 20.3 | 20.2 | 22.8 | 27.0 |
| $Li_2O$ | 5.5 | 5.4 | 5.3 | 5.3 | 4.9 | 5.3 | 7.0 |
| NiO | 0.6 | 0.8 | 0.8 | 0.9 | 0.9 | 0.9 | 1.2 |
| $TiO_2$ | 4.1 | 4.1 | 5.0 | 5.0 | 5.0 | 5.0 | 3.6 |
| $As_2O_3$ | 0.5 | 0.5 | 0.5 | 0.5 | 0.5 | 0.5 | 0.7 |
| $Na_2O$ | — | — | — | — | 0.8 | — | — |
| $P_2O_5$ | — | — | — | — | — | 3.6 | — |

|  | 8 | 9 | 10 | 11 | 12 | 13 | 14 |
|---|---|---|---|---|---|---|---|
| $SiO_2$ | 60.4 | 59.3 | 67.3 | 68.5 | 67.8 | 60.2 | 67.7 |
| $Al_2O_3$ | 22.6 | 22.3 | 20.4 | 20.4 | 20.2 | 26.9 | 20.2 |
| $Li_2O$ | 3.8 | 3.8 | 4.8 | 4.2 | 4.5 | 7.5 | 4.7 |
| NiO | 2.5 | 2.5 | 2.4 | 3.8 | 0.9 | 1.2 | 0.4 |
| $TiO_2$ | 3.6 | 5.3 | 3.4 | 2.7 | 5.0 | 3.6 | 5.0 |
| $As_2O_3$ | 0.4 | 0.4 | 0.4 | 0.5 | 0.5 | 0.7 | 0.5 |
| $Na_2O$ | 0.3 | 0.4 | — | — | — | — | — |
| $P_2O_5$ | 6.3 | 6.2 | — | — | — | — | — |
| $ZrO_2$ | — | — | 1.3 | — | — | — | — |

TABLE I-continued

|  |  |  |  |  | | | |
|---|---|---|---|---|---|---|---|
| MgO | — | — | — | — | 1.0 | — | 0.5 |
| ZnO | — | — | — | — | — | — | 1.0 |

|  | 15 | 16 | 17 | 18 | 19 | 20 | 21 |
|---|---|---|---|---|---|---|---|
| $SiO_2$ | 67.5 | 67.0 | 68.1 | 68.7 | 59.9 | 59.3 | 67.9 |
| $Al_2O_3$ | 20.1 | 20.0 | 20.3 | 20.5 | 26.8 | 26.5 | 20.2 |
| $Li_2O$ | 4.8 | 4.1 | 4.4 | 4.2 | 6.0 | 5.9 | 3.4 |
| NiO | 0.9 | 1.9 | 1.1 | 1.9 | 1.2 | 1.2 | 3.8 |
| $TiO_2$ | 5.0 | 5.1 | 4.0 | 2.7 | 3.5 | 4.4 | 2.7 |
| $As_2O_3$ | 0.5 | 0.5 | 0.5 | 0.5 | 0.7 | 0.7 | 0.5 |
| MgO | 0.5 | 0.5 | 0.5 | 0.5 | 0.7 | 0.7 | 0.5 |
| ZnO | 1.0 | 1.0 | 1.0 | 1.0 | 1.4 | 1.3 | 1.0 |

|  | 22 | 23 | 24 | 25 | 26 | 27 | 28 |
|---|---|---|---|---|---|---|---|
| $SiO_2$ | 65.2 | 38.8 | 38.0 | 71.2 | 70.6 | 69.6 | 68.9 |
| $Al_2O_3$ | 19.4 | 34.6 | 33.9 | 21.2 | 21.0 | 20.8 | 17.9 |
| $Li_2O$ | 4.0 | — | — | 5.1 | 4.3 | 4.2 | 5.7 |
| NiO | 1.8 | 1.6 | 1.6 | 2.0 | 2.0 | 1.9 | 1.9 |
| $TiO_2$ | 7.7 | 6.9 | 6.7 | — | — | 1.4 | 5.1 |
| $As_2O_3$ | 0.5 | 0.4 | 0.4 | 0.5 | 0.5 | 0.5 | 0.5 |
| MgO | 0.5 | 1.7 | 1.7 | — | 0.5 | 0.5 | — |
| ZnO | 1.0 | — | — | — | 1.1 | 1.1 | — |
| $Na_2O$ | — | 16.0 | 11.8 | — | — | — | — |
| $K_2O$ | — | — | 6.0 | — | — | — | — |

Table II reports several heat treatments applied to the exemplary compositions of Table I and the visual appearance displayed by the examples after heat treatment. The articles were transparent except where noted otherwise. X-ray diffraction analyses are also reported where a silicate phase was observed. The presence of such phases indicates a heat treatment at too high a temperature and/or too long an exposure for the particular glass composition involved. The occurrence of the silicate phase results in the development of opacity in the glass and/or the appearance of a coloration other than green.

The heat treatments in Table II involved placing samples of the several glasses within an electrically-fired furnace and raising the temperature thereof at about 300° C./hour to the reported temperature. As a matter of convenience and control, a dwell period at a specific temperature was utilized. Nevertheless, that practice is not necessary, the sole requirement being that the glass body is maintained within the 675°-900° C. temperature range for a sufficient length of time to effect the growth of $NiO.Al_2O_3$ crystals with the consequent development of green coloration. Where several heat treatments were applied to an example to illustrate the effect of composition, time, and temperature on the behavior of the glass and the stability of the green glassy state, the heat treatment effecting the most desirable product is underscored.

In the laboratory examples, the heat treated articles were cooled to room temperature by simply turning off the electric current to the furnace and allowing the furnace to cool with the crystallized articles retained therein. This was termed "cooling at furnace rate" which has been estimated to average about 200°-300° C./hour. That practice is not required and was only employed as a matter of convenience.

TABLE II

| Example No. | Heat Treatment | Visual Appearance | Crystallinity |
|---|---|---|---|
| 1 | 700° C. - 2 hours | Brown | |
| 1 | 750° C. - 2 hours | Light yellow-green | |
| 1 | 800° C. - 2 hours | Green | |
| 1 | 850° C. - 2 hours | Red-brown | Beta-quartz, s.s. |
| 2 | 800° C. - 2 hours | Yellow-green | |
| 3 | 800° C. - 2 hours | Yellow-green | |
| 4 | 700° C. - 1 hour | Yellow-green | |
| 4 | 750° C. - 1 hour | Green | |
| 4 | 800° C. - 1 hour | Green | |
| 4 | 800° C. - 5 hours | Red-brown | Beta-quartz, s.s. |
| 5 | 800° C. - 1 hour | Green | |
| 6 | 750° C. - 1 hour | Bright green | |

TABLE II-continued

| Example No. | Heat Treatment | Visual Appearance | Crystallinity |
|---|---|---|---|
| 7 | 750° C. - 2 hours | Green | |
| 8 | 825° C. - 4 hours | Deep green | |
| 8 | 825° C. - 16 hours | Deep green | |
| 8 | 900° C. - 4 hours | Deep green | |
| 8 | 900° C. - 16 hours | Translucent green | Beta-spodumene s.s. |
| 9 | 825° C. - 4 hours | Deep green | |
| 9 | 875° C. - 4 hours | Hazy green | Beta-quartz s.s. |
| 10 | 800° C. - 5 hours | Deep green | |
| 10 | 800° C. - 16 hours | Deep emerald green | Beta-quartz s.s. |
| 10 | 825° C. - 4 hours | Deep green | Beta-quartz s.s. |
| 10 | 825° C. - 16 hours | Deep red-brown | Beta-quartz s.s. |
| 11 | 750° C. - 2 hours | Deep emerald | |
| 11 | 850° C. - 2 hours | Very deep blue-green | |
| 11 | 850° C. - 16 hours | Very deep blue-green | |
| 12 | 750° C. - 1 hour | Bright green | |
| 13 | 750° C. - 2 hours | Green | |
| 14 | 750° C. - 1 hour | Brown | |
| 14 | 800° C. - 1 hour | Olive green | |
| 14 | 800° C. - 5 hours | Brown | Beta-quartz s.s. |
| 14 | 850° C. - 1 hour | Brown | Beta-quartz s.s. |
| 15 | 800° C. - 1 hour | Green | |
| 16 | 750° C. - 1 hour | Emerald | |
| 16 | 850° C. - 4 hours | Emerald | |
| 17 | 700° C. - 1 hour | Yellow-green | |
| 17 | 750° C. - 2 hours | Green | |
| 18 | 800° C. - 2 hours | Weak green | |
| 18 | 800° C. - 16 hours | Deep green | |
| 18 | 850° C. - 2 hours | Deep green | |
| 19 | 750° C. - 2 hours | Emerald | |
| 19 | 800° C. - 2 hours | Opaque olive-green | Beta-quartz s.s. |
| 20 | 675° C. - 5 hours | Olive green | |
| 20 | 750° C. - 2 hours | Emerald | |
| 21 | 800° C. - 2 hours | Very deep green | |
| 21 | 850° C. - 16 hours | Very deep blue-green | |
| 22 | 700° C. - 1 hour | Green | |
| 23 | 750° C. - 1 hour | Deep green | |
| 23 | 850° C. - 16 hours | Deep green | |
| 24 | 750° C. - 1 hour | Deep green | |
| 24 | 850° C. - 16 hours | Deep green | |

Examples 25-28 do not form a green-colored glass body upon heat treatment and, hence, act to delimit the compositional scope of the instant invention. Examples 25 and 26 contain no $TiO_2$ whatever, and Example 27 has too low an amount. In Example 28 the molar ratio of $Al_2O_3$ to the sum of $Li_2O$ + NiO (the modifying ions) is less than 0.95.

Although heat treatment temperatures as low as 675° C. can be operable with some glass compositions, the preferred minimum is about 700° C. At temperatures much above about 900° C., crystallization of a silicate crystal phase becomes a severe problem. Therefore, the preferred maximum treating temperature is about 850° C.

In general, the stability of the green glassy state is enhanced as the level of NiO is increased. Hence, Example 14 exhibits the barest of greenish tints after an exposure of 1 hour to 800° C. In contrast, glasses such as Examples 8, 9, 11, and 21, containing high percentages of NiO, demonstrate extended stability ranges. Example 10 illustrates that the incorporation of $ZrO_2$ can be tolerated with the resulting product having a deeper greenish hue. Normally, $ZrO_2$ additions will advantageously be held below about 3%.

Where desired, the heat treated glasses, and particularly the $Li_2O$-containing glasses, can be chemically strengthened with relative ease at low temperatures to yield bodies exhibiting exceptional modulus of rupture measurements. The glassy materials are subjected to an external source of $Na^+$ and/or $K^+$ ions at a temperature above about 300° C., but below the strain point of the glass, for a length of time sufficient to cause the exchange, on a molar basis, of at least a portion of the $Li^+$ or $Na^+$ ions from the glass surface with $Na^+$ and/or $K^+$ ions from the external source. The mechanism of this ion exchange reaction by which an integral surface compression layer is developed on the glass article is well-known to the art, as is exemplified in U.S. Pat. No. 3,790,430. Thus, there is a concentration of larger alkali metal ions ($Na^+$ and/or $K^+$) which is greater in the surface layer of the glass article than in the interior and, conversely, the concentration of the smaller alkali metal ions ($Li^+$ or $Na^+$) is greater in the interior portion of the glass article than in the surface layer. It is this difference in concentration which creates the compressive stresses in the surface layer. With the glasses of the present invention, the ion exchange reaction will commonly be conducted at temperatures ranging between about 350°-550° C., depending upon glass composition. The highly glassy nature of the green colored materials results in strengths (expressed in terms of psi modulus of rupture) equivalent to those exhibited by the as-formed brown colored glasses after chemical strengthening. This phenomenon is manifested in Table III below. In general, modulus of rupture values in excess of 50,000 psi will be attained on abraded specimens. The high abraded and unabraded strengths demonstrated by these glasses, coupled with their transparency, recommend their utility for such consumer applications as bowls, decanters, tumblers, and the like. An explanation regarding abraded and unabraded strength measurements can be found in U.S. Pat. No. 3,790,430 above, and reference is made thereto for that discussion.

TABLE III

| Example No. | Heat Treatment | Visual Appearance | Ion Exchange Medium | Ion Exchange Treatment | Abraded Strength | Unabraded Strength | Strain Point |
|---|---|---|---|---|---|---|---|
| 6 | 750° C. - 2 hours | Green | $NaNO_3$-$KNO_3$ | 370° C. - 2 | 61,500 | 112,000 | |

TABLE III-continued

| Example No. | Heat Treatment | Visual Appearance | Ion Exchange Medium | Ion Exchange Treatment | Abraded Strength | Unabraded Strength | Strain Point |
|---|---|---|---|---|---|---|---|
| 7 | " | " | eutectic mixture " | 420° C. - 0.5 hour | 109,400 | | |
| 13 | None | Brown | " | 420° C. - 0.5 hour | 96,000 | | |
| 13 | 750° C. - 2 hours | Green | " | " | 115,600 | | |
| 15 | None | Deep brown | None | None | 11,600 | 24,900 | 656° C. |
| 15 | None | Deep brown | NaNO$_3$-KNO$_3$ eutectic mixture | 370° C. - 2 hours | 56,100 | 92,300 | |
| 15 | 750° C. - 2 hours | Green | None | None | 8500 | 21,700 | 676° C. |
| 15 | 750° C. - 2 hours | Green | NaNO$_3$-KNO$_3$ eutectic mixture | 370° C. - 2 hours | 55,000 | 101,000 | |
| 19 | None | Deep brown | None | None | 33,280 | | |
| 19 | 750° C. - 2 hours | Emerald | NaNO$_3$-KNO$_3$ eutectic mixture | 370° C. - 2 hours | 87,900 | 118,200 | |
| 19 | " | " | " | 420° C. - 0.5 hour | 89,200 | | |
| 20 | " | " | " | 370° C. - 2 hours | 97,600 | 124,500 | |

I claim:

1. A method for making a transparent green glass article containing crystallites in an amount of less than about 5% by volume, said crystallites consisting of nickel spinel, which consists of the steps of:
   a. melting a batch for a glass having an overall composition selected from the group:
      A. a glass consisting essentially, by weight on the oxide basis, of about 3–7.5% Li$_2$O, 18–28% Al$_2$O$_3$, 58–72% SiO$_2$, 0.3–4.5% NiO, 2.5–8% TiO$_2$, and 0–3% ZrO$_2$, the molar ratio of Al$_2$O$_3$ to the sum of all modifier ions being at least 0.95; and
      B. a glass approximating the stoichiometry of carnegieite consisting essentially, by weight on the oxide basis, of about 10–20% Na$_2$O, 30–35% Al$_2$O$_3$, 35–40% SiO$_2$, 1–3% NiO, 4–8% TiO$_2$, 0–10% K$_2$O, and 0–3% ZrO$_2$, the molar ratio of Al$_2$O$_3$ to the sum of all modifier ions being at least 0.95;
   b. simultaneously cooling said melt to at least below the transformation range threof and shaping a transparent glass article therefrom;
   c. heating said transparent glass article to a temperature of at least about 675° C., but not more than about 900° C., for a period of time sufficient to cause the growth in situ of nickel spinel crystallites; and then
   d. cooling said crystallized article to room temperature, said article being transparent with a green coloration.

2. A method according to claim 1 wherein said glass article is heated to a temperature between about 700°–850° C.

3. A method according to claim 1 wherein said nickel spinel crystallites have diameters smaller than the wavelength of visible light.

4. A transparent green glass article containing crystallites in an amount of less than about 5% by volume, said crystallites consisting of nickel spinel, made in accordance with claim 1.

5. A transparent green glass article according to claim 4 wherein said nickel spinel crystallites have diameters smaller than the wavelength of visible light.

6. A method for making a transparent green glass article containing crystallites in an amount of less than about 5% by volume, said crystallites consisting of nickel spinel, said article exhibiting a modulus of rupture of at least about 50,000 psi after being subjected to surface abrasion, and having an integral surface compression layer, which consists of the steps of:
   a. melting a batch for a glass having an overall composition selected from the group:
      A. a glass consisting essentially, by weight on the oxide basis, of about 3–7.5% Li$_2$O, 18–28% Al$_2$O$_3$, 58–72% SiO$_2$, 0.3–4.5% NiO, 2.5–8% TiO$_2$, and 0–3% ZrO$_2$, the molar ratio of Al$_2$O$_3$ to the sum of all modifier ions being at least 0.95; and
      B. a glass approximating the stoichiometry of carnegieite consisting essentially, by weight on the oxide basis, of about 10–20% Na$_2$O, 30–35% Al$_2$O$_3$, 35–40% SiO$_2$, 1–3% NiO, 2, 4–8% TiO$_2$, 0–10% K$_2$O, and 0–3% ZrO$_2$, the molar ratio of Al$_2$O$_3$ to the sum of all modifier ions being at least 0.95;
   b. simultaneously cooling said melt to at least below the transformation range thereof and shaping a transparent glass article therefrom;
   c. heating said glass article to a temperature of at least about 675° C., but not more than about 900° C., for a period of time sufficient to cause the growth in situ of nickel spinel crystallites;
   d. subjecting said crystallized glass article, said article being transparent with a green coloration, to an ion exchange reaction selected from the group:
      I. contacting a surface of a transparent crystallized glass article made from a batch according to paragraph (A) above with an external source of Na$^+$ and/or K$^+$ ions at a temperature of at least 300° C., but below the strain point of the glass, for a period of time sufficient to cause an exchange of Na$^+$ and/or K$^+$ ions on a molar basis for Li$^+$ ions within the glass surface, this exchange causing the development of an integral surface compression layer on said transparent crystallized glass article; and
      II. contacting a surface of a transparent crystallized glass article made from a batch according to paragraph (B) above with an external source of K$^+$ ions at a temperature of at least 300° C., but below the strain point of the glass, for a period of time sufficient to cause an exchange of K$^+$ ions on a molar basis for Na$^+$ ions within the glass surface, this exchange causing the development of an integral surface compression layer on said transparent crystallized glass article.

7. A method according to claim 6 wherein said glass article is heated to a temperature between about 700°–850° C.

8. A method according to claim 6 wherein said crystallized glass article is contacted with an external source of Na+ and/or K+ ions at a temperature between about 350°–550° C.

9. A method according to claim 6 wherein said external source of Na+ and/or K+ ions is a bath of a molten sodium and/or potassium salt.

10. A transparent green glass article containing crystallites in an amount of less than about 5% by volume, said crystallites consisting of nickel spinel, said article exhibiting a modulus of rupture of at least about 50,000 psi after being subjected to surface abrasion, and having an integral surface compression layer made in accordance with claim 6.

11. A transparent green glass article according to claim 10 wherein said nickel spinel crystallites have diameters smaller than the wavelength of visible light.

* * * * *

UNITED STATES PATENT AND TRADEMARK OFFICE
CERTIFICATE OF CORRECTION

PATENT NO. : 4,059,454
DATED : November 22, 1977
INVENTOR(S) : Richard F. Reade

It is certified that error appears in the above-identified patent and that said Letters Patent are hereby corrected as shown below:

Column 5, line 62, change "$Na^{30}$" to -- $Na^+$ -- .

Column 6, line 33, change "$Li^{30}$" to -- $Li^+$ -- .

Claim 6, Part B, line 4, omit the number 2 immediately following NiO, and preceding 4-8%.

Signed and Sealed this

Ninth Day of May 1978

[SEAL]

Attest:

RUTH C. MASON
Attesting Officer

LUTRELLE F. PARKER
Acting Commissioner of Patents and Trademarks